United States Patent  (10) Patent No.: US 7,075,409 B2
Guba  (45) Date of Patent: Jul. 11, 2006

(54) APPARATUS AND METHOD FOR A VALET KEY BASED PASSIVE SECURITY SYSTEM

(75) Inventor: George A Guba, Clarkston, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 238 days.

(21) Appl. No.: 10/342,733

(22) Filed: Jan. 15, 2003

(65) Prior Publication Data

US 2004/0135670 A1    Jul. 15, 2004

(51) Int. Cl.
H04Q 9/00 (2006.01)
G05B 19/00 (2006.01)
B60R 25/10 (2006.01)
B60R 25/04 (2006.01)

(52) U.S. Cl. .................. 340/5.21; 340/5.61; 340/5.62; 340/5.63; 340/5.64; 340/5.54; 340/426.16; 340/426.17; 307/10.5

(58) Field of Classification Search ............... 340/5.21, 340/5.61, 5.62, 5.63, 5.64, 5.54, 5.72, 426.16, 340/426.17; 307/10.5
See application file for complete search history.

(56) References Cited

U.S. PATENT DOCUMENTS

| 4,760,393 | A |   | 7/1988  | Mauch |
| 5,309,152 | A | * | 5/1994  | Krucoff ...................... 340/5.67 |
| 6,130,606 | A | * | 10/2000 | Flick ........................ 340/426.14 |
| 6,188,326 | B1 |  | 2/2001  | Flick |
| 6,271,745 | B1 | * | 8/2001  | Anzai et al. ................ 340/5.53 |
| 6,275,141 | B1 |  | 8/2001  | Walter |
| 6,628,196 | B1 | * | 9/2003  | Flick ........................ 340/426.13 |
| 6,748,536 | B1 |  | 6/2004  | Madau |

* cited by examiner

Primary Examiner—Jeffery Hofsass
Assistant Examiner—Scott Au
(74) Attorney, Agent, or Firm—Ralph E. Smith

(57) ABSTRACT

A control system for vehicle devices uses an access control device to specify an identification datum, which is used by a control module to modify operation of a set of vehicle devices and functions of such devices. The control module can either disable access to the set of devices or modify operations of the vehicle devices by limiting the functionality of the selected vehicle devices. A valet using a valet key can drive the car under restrictions and a selected set of vehicle devices can be disabled during a valet's use of the vehicle.

7 Claims, 2 Drawing Sheets

APPARATUS AND METHOD FOR A VALET KEY BASED PASSIVE SECURITY SYSTEM

FIELD OF THE INVENTION

The present invention generally relates to the control of vehicle devices and more particularly to controlling access to vehicle functions depending on a user's security access level.

BACKGROUND OF THE INVENTION

Automobile design trends are pointing towards including a variety of devices on an automobile. Another trend is to allow different users to customize various devices installed on an automobile depending on which of the several regular users of the car is using the car. For example, customized seat adjustments, climate control preferences, radio station and music preferences, etc., are the common preference that each user of the automobile may want to customize and store for future use.

A typical automobile may be used by drivers other than the owner of that automobile. In such situation it is necessary to protect various vehicle devices and settings from being changed or tampered by unauthorized users of the vehicle. It would be tedious to individually lock each of the devices every time a user like a valet or a young driver from the family uses the automobile. Hence, there is a need for a convenient mechanism to protect multiple devices installed on an automobile, where such protection operates in recognition of the type of driver using the automobile.

Proliferation of devices installed in an automobile has increased the need to protect the vehicle and various devices installed on the vehicle. For example, a given automobile can be shared by an owner and his employee. The employer-owner of the car can store phone numbers of his family and friends on the cellular phone installed in the car. The employer may want the employee to use the car at times, but the employer may not like the employee to access the stored personal numbers. In such situations, it becomes critical to allow access to certain functions of the car, but also to disable other functions.

A locking or disabling facility may be provided for each individual vehicle device that holds personal data. However, a user of an automobile may find it tedious to lock each device that stores personal data every time he or she exits the automobile. Hence, there is a need to provide a convenient way to protect personal data that is stored on various vehicle devices. It is desirable that such protection should not require extensive modifications to existing vehicle designs. Further, such protection should preferably be implemented without requiring specialized and expensive components.

Apart from the above devices automobiles may include controls for various basic functions. For example, engines, transmissions, telematics, cruise control etc. that are mounted on a vehicle are commonly controlled by electrical control systems. There is a need to provide a convenient way to allow certain users to access certain basic functions, while disallowing access to other functions. For example, a valet using the car with a valet key should be allowed to drive the car, but may not drive the car beyond a set mileage. Another example may be a rental car situation, where the rental car company may want to limit the maximum speed of the car to a set limit to protect the car.

There is a need for a convenient and low cost mechanism to control access and functions of the multiple functions of the car and devices installed on the car. Such control should allow either complete disabling of a set of devices or allowing limited functionality of such devices.

SUMMARY OF THE INVENTION

A control system uses an access control mechanism to determine the type of the users and the rights of the user to use the vehicle and devices associated with the vehicle. A control module is used to either disable access to a set of vehicle devices or modify operation of the vehicle devices to limit the functionality of the selected vehicle devices. For example, when a valet key is inserted, the car can be driven for a certain distance, but the valet-user cannot access any devices on the vehicle. The system enhances security of the vehicle and vehicle devices without requiring an additional security device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
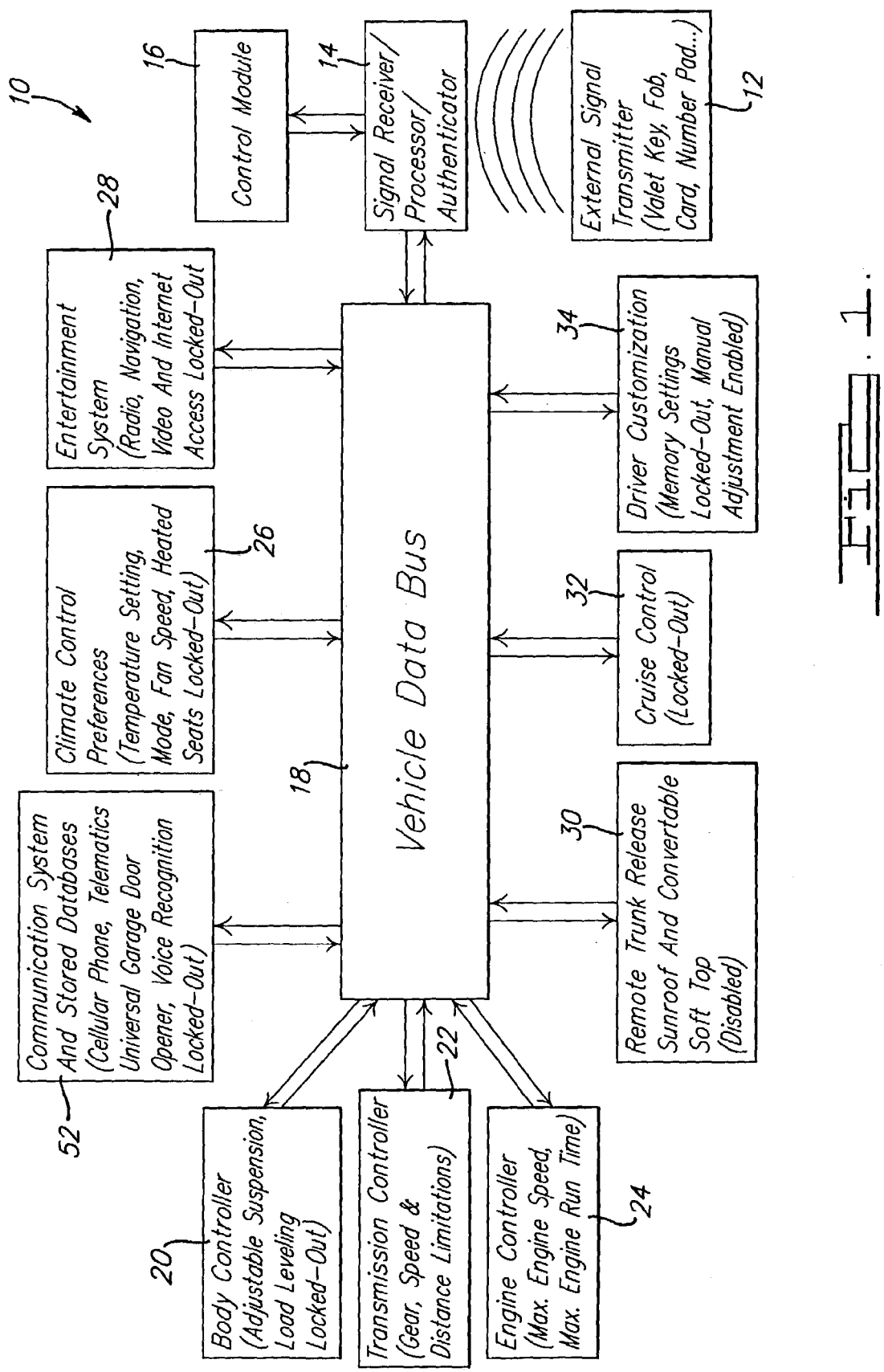
FIG. 1 is a block diagram showing a control system of an embodiment of the present invention.

FIG. 1 is a block diagram showing a control system 10 of an embodiment of the present invention. The control system 10 includes an entry system 12 which typically would be an external signal transmitter. The entry system 12 functions as an access control system. For example, the entry system 12 can be a valet key, a fob, a card having embedded electronics, a numeric keypad, smart card, a credit-card, a key, an embedded chip, a radio-frequency signal, a magnetic tag, remote key-fob, passive entry transmitter card, etc. Those skilled in the art will appreciate that the type of entry system 12 used in any particular embodiment of the present invention does not limit the invention.

Entry system 12 is operatively connected to a signal receiver 14. In case of radio-frequency (RF) or infrared type of entry systems 12, the connection between the entry system 12 and the signal receiver 14 will be over a wireless medium such as RF or infrared signals. In case of keypad or fingerprint identifier type of entry systems 12, there can be an electrical connection between the entry system 12 and the signal receiver 14. For any type of connection between the entry system 12 and the signal receiver 14, the entry system 12 will send a signal identifying the device, and hence also identifying the type of user, to the signal receiver 14. Those skilled in the art will appreciate that the entry system 12 and the signal receiver 14 can be operatively connected by any means, and the above examples of such connections are just examples and hence do not limit the invention.

The signal receiver 14 processes the device identifier received from the entry system 12. For example, if the entry system is a valet key with an embedded electronic signature, then the entry system 12 will transmit the embedded electronic signature to the signal receiver 14. The signal receiver 14 will recognize the signature as that of the valet key based upon previously programmed information. The signal receiver first authenticates the validity of the entry system 12. If an unknown key or device is used, then the signal receiver 14 will generate a special signal that will lock all devices on the vehicle. The signal processor 14 will send an appropriate signal representing a presence of a valet key to a control module 16. The control module 16 can be implemented as a hardware circuit, a software module or a combined hardware-software mechanism. The operation of the control module 16 is described next.

Control module 16 performs the function of controlling and/or disabling a set of devices depending upon the type of signal identified by the signal receiver 14. For example, if the control module 16 receives a signal that the inserted key is a valet key, then the control module 16 will generate appropriate signals to disable access to a set of devices. The entry system 12, the signal receiver 14 and the control module 16 are all preferably connected to a vehicle bus 18. The vehicle bus 18 can be, for example, a CAN data bus or any other bus capable of carrying electrical control signals. Those skilled in the art will appreciate that any appropriate bus may be used.

The control module 16 can disable or control the access to the functions of multiple devices. Thus, multiple users can conveniently use the automobile. Certain of those multiple users such as valets, young drivers, employees, etc., have limited access to a set of devices or functions of devices. The control module can control multiple devices installed on the automobile, and any set of basic automobile functions that are electrically controlled. Non-limiting examples of the vehicle devices and functions that can be controlled are described next. Those skilled in the art will appreciate that the examples are for illustration purposes only and the same do not the limit the invention.

Several devices can be connected to the vehicle bus 18. Apart from devices, several basic automobile parts that have electrical or electronic controls can be connected to the vehicle bus 18. Examples of basic automobile controls connected to the vehicle bus are as follows: a body controller 20 that controls the adjustable suspension and load leveling; a transmission controller 22 that controls gear, speed and distance limitations; and an engine controller 24 that controls maximum engine speeds and maximum engine runtime. Examples of devices that can be controlled are as follows: communication systems 52 that include cellular phones, telematics, universal garage door opener, etc.; climate controls 26 that control various in-vehicle devices such as air-conditioners, heat, fans, etc.; and entertainment systems 28 such as radios, video, navigation advisers, etc. Further functions that can be controlled are: general controls 30 such as remote trunk release, sunroofs etc.; cruise control 32; driver customizations 34 such as steering height, etc. The above listed devices and functions are illustrative of the range of control module 16's coverage of controls and the same are for example purposes only. Operation of the control system 10 is described in the next figure in context of a non-limiting example.

Figure 2:
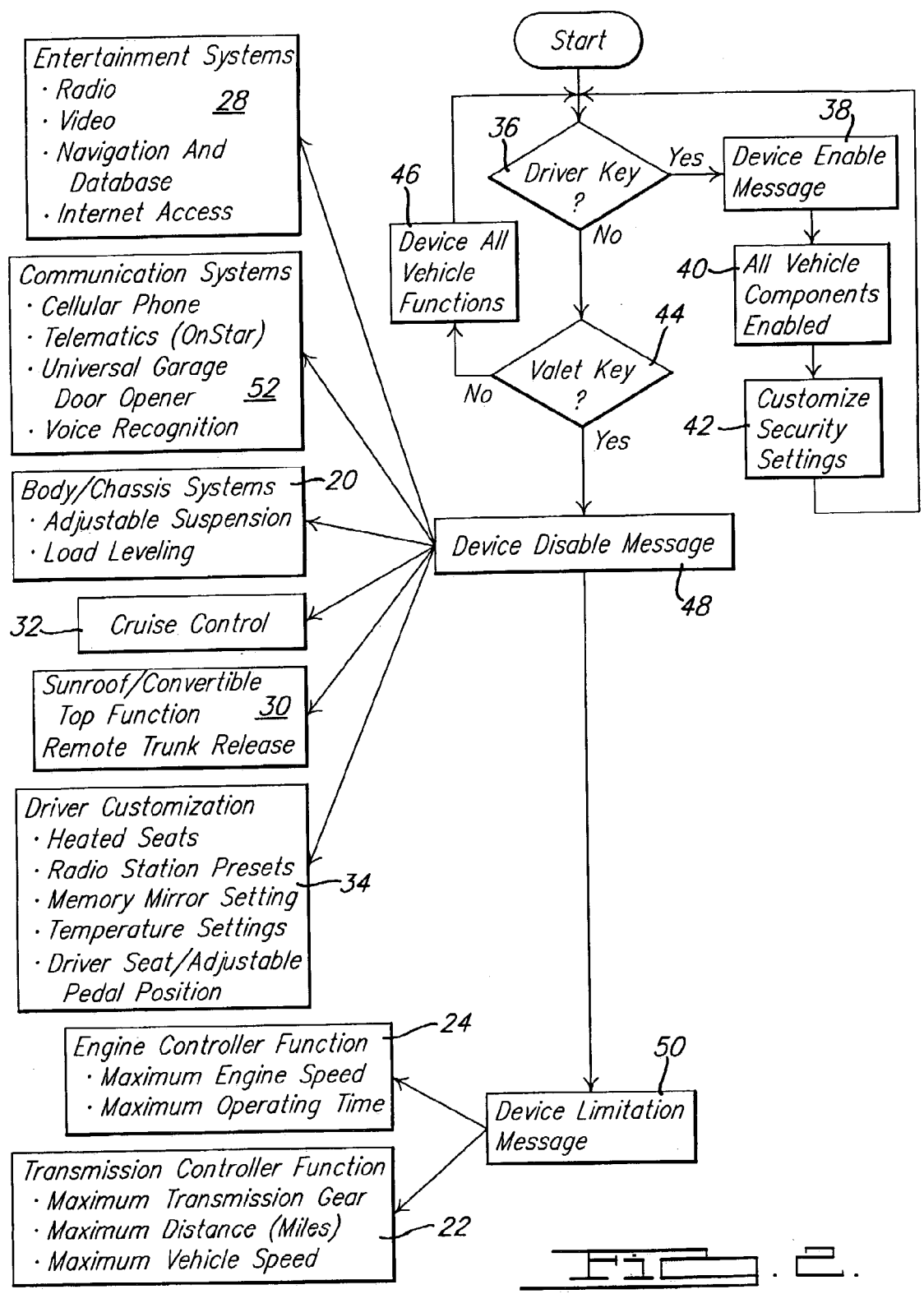
FIG. 2 is a flow-chart depicting the decision making process carried out in an embodiment of the present invention.

FIG. 2 is a flow-chart depicting the operational steps carried out in an embodiment of the present invention. As an example, two types of keys having embedded electronic signatures are considered as entry systems 12 (shown in FIG. 1). The first key is a driver key having all possible privileges of operating the automobile and any devices associated with the automobile. The second key is a valet key. The control module 16 and the signal receiver 14 (both as shown in FIG. 1) are programmed to recognize different signals received from the driver key and the valet key.

Starting at step 36, the signal receiver 14 checks for the presence of a driver key. If the signal receiver determines that a driver key is present in the ignition lock then a device enable message is sent to the control module 16 as shown at step 38. At step 40, the control module sends separate signals over the vehicle bus 18 (shown in FIG. 1) to all vehicle components that have electrical or electronic controls to enable the driver to access all components. At step 42, the driver is allowed to customize security settings as he or she desires. The control system 10 then returns to wait for a new signal for the type of key.

If at step 36, the signal receiver determines that the inserted key is not a driver key then the system proceeds to step 44, where a check is made to ascertain if the inserted key is a valet key. If the inserted key is not a valet key, then at step 46 all vehicle functions are disabled since an unknown or unauthorized key is inserted in the vehicle. Thereafter, the control goes back to the beginning and waits for a new key.

In case at step 44, the system determines that the inserted key is a valet key then a disable device message is issued at step 48 over the vehicle bus 18 to various components, devices or parts. The devices that can be disabled in the presence of a valet key are, for example, as follows: a body controller 20, communication systems 52, entertainment systems 28, general controls 30, cruise control 32 and driver customizations 34. A valet should be able to drive the automobile in order to park it properly, hence a device limitation message is sent at step 50 to the transmission controller 22 and the engine controller 24. Such a device limitation message sets the limits for maximum engine speed and maximum operating time through the engine controller 24. Further, the transmission controller 22 is also limited with respect to maximum transmission gear, maximum distance in miles or maximum vehicle speed.

The control system 10 provides a convenient way for disabling a set of devices or their functions when a valet is using the automobile as described above. Hence, the security of the vehicle and its owner is enhanced, since the risk of valet tampering with any of the vehicle devices by misusing them is reduced to a minimum. Further, the risk of the valet stealing the automobile or taking the automobile for a frolic is also minimized, since limitations are imposed on the number of miles the automobile can be driven. The security system is implemented without requiring the owner to use an extra security device in order to differentiate between users. Further, there is no need to separately lock each device.

The above example describes the system when a valet is using the automobile with the valet key. Those skilled in the art will appreciate that the above example is only an illustration, and the system can be extended to any case where multiple users are using the car and have differing privileges. For example, in case of a family car, the parents may want their child having a license to drive the family car, but can limit the child's ability to modify certain settings or to drive car beyond a certain set speed limit, etc. Different access control devices (like keys) for multiple users can be either supplied by the manufacturer or facilities can be provided on the automobile itself to program such different keys. Those skilled in the art will appreciate that the manner of programming access control devices does not limit the invention in any manner.

The control system 10 of the present invention improves security of the vehicle and its owner. The system provides a convenient way to differentiate and limit the rights and privileges of different types of users of the automobile without requiring an additional security device.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle based access control system for controlling access to at least one vehicle telematics device, the system comprising:

first and second ignition keys respectively having a first and a second identification datum specifying first and second access rights of a key user, wherein one of said first and second ignition keys comprises a valet key including an embedded transmitter having a unique identity;

a receiver port associated with an ignition switch of the vehicle for reading an identification datum on a key inserted into the ignition switch; and a control module coupled to the receiver port and to the at least one vehicle telematics device for recognizing the identification datum received from the receiver port and modifying a predetermined set of operating features of the at least one vehicle telematics device based on an access right specified by the identification datum the control module further operative to disable the at least one vehicle telematics device upon recognizing the unique identity of the valet key.

2. The vehicle based access control system of claim 1, wherein said at least one vehicle telematics device comprises at least one of communication devices, vehicle databases, navigation systems, audio systems, vehicle personalization systems, video systems, preferences stored in an electronic memory, and voice command controls.

3. The vehicle based access control system of claim 1, further comprising:

an electronic bus for coupling said receiver port to said control module.

4. The vehicle based access control system of claim 3 wherein said control module comprises:

a key signal processing circuit connected to said receiver port and operative to receive identification datum loaded by said receiver port from an inserted key, said key signal processing circuit identifying said inserted key and generating an operating features modification signal based on said identification datum; and a control circuit coupled to said electronic bus, said control circuit modifying operating features of the at least one vehicle telematics device upon receiving said operating features modification signal.

5. The vehicle based access control system of claim 1 wherein said control module modifies operation of the at least one vehicle telematics device to control at least one vehicle operation parameter.

6. The vehicle based access control system of claim 5 wherein said vehicle operation parameter comprises at least one of distance traveled, fuel consumed, speed of the vehicle, vehicle location as determined by a global positioning system (GPS), and climate control inside the vehicle.

7. The vehicle based access control system of claim 1 wherein the control module, upon recognition of a predetermined one of the first and second identification data, enables the key user to customize at least one of the first and second access rights.

* * * * *